Jan. 4, 1944.                R. L. READING                2,338,202
                          WIRE TESTING APPARATUS
                           Filed Jan. 6, 1941                4 Sheets-Sheet 1

INVENTOR.
Raymond L. Reading
BY Soans, Pond, & Anderson
ATTYS.

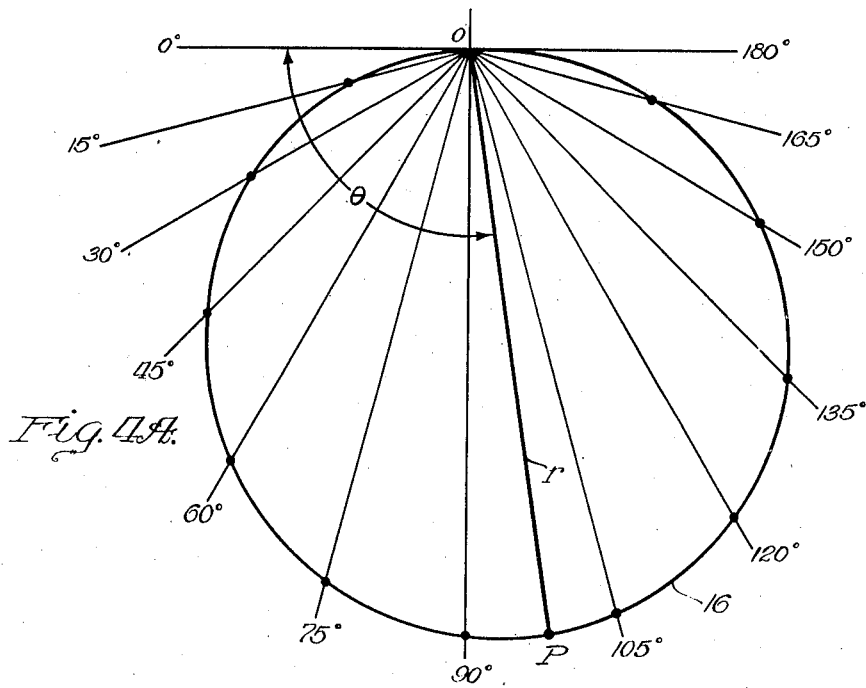
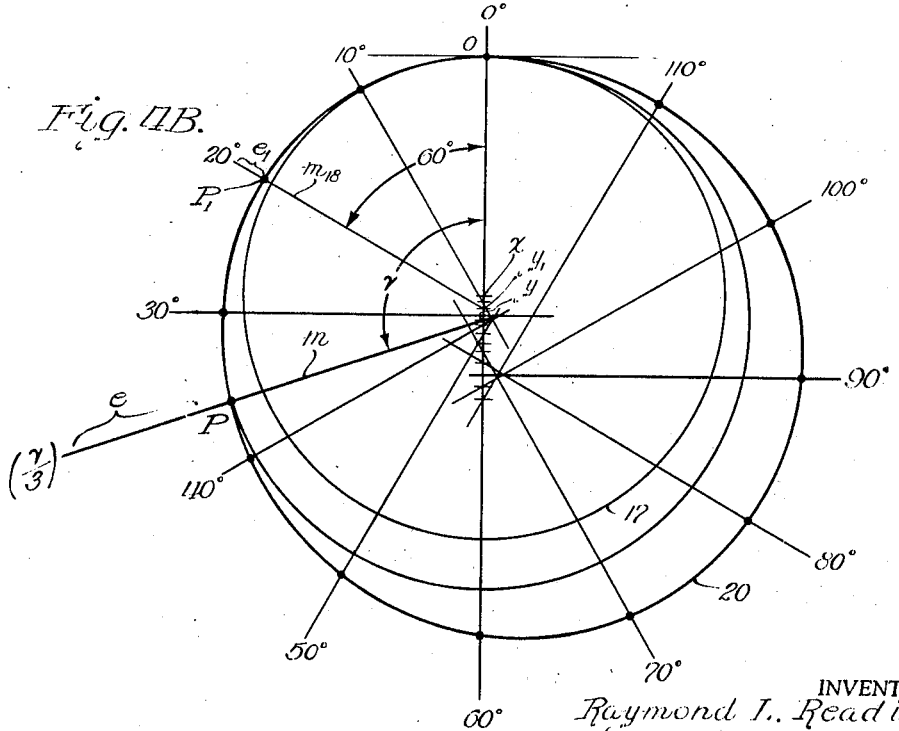

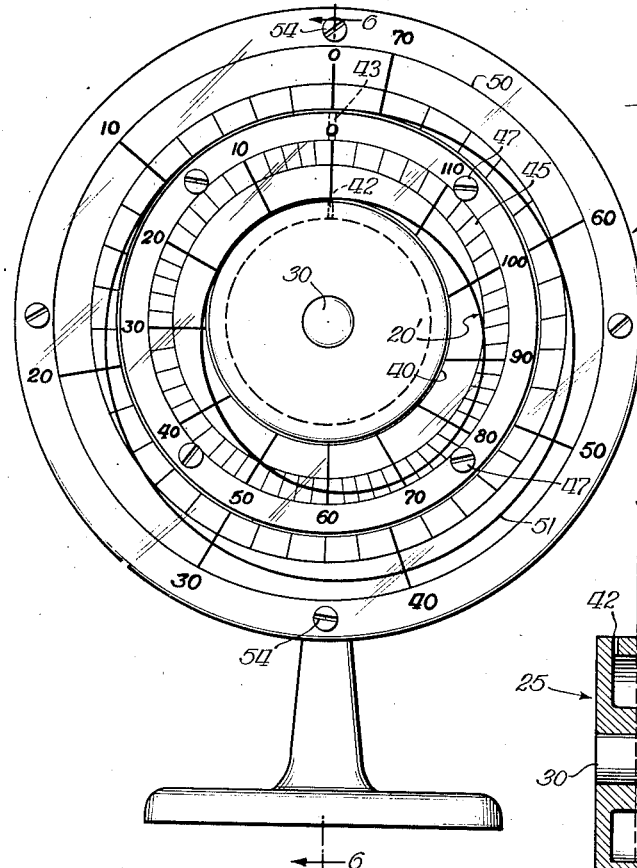
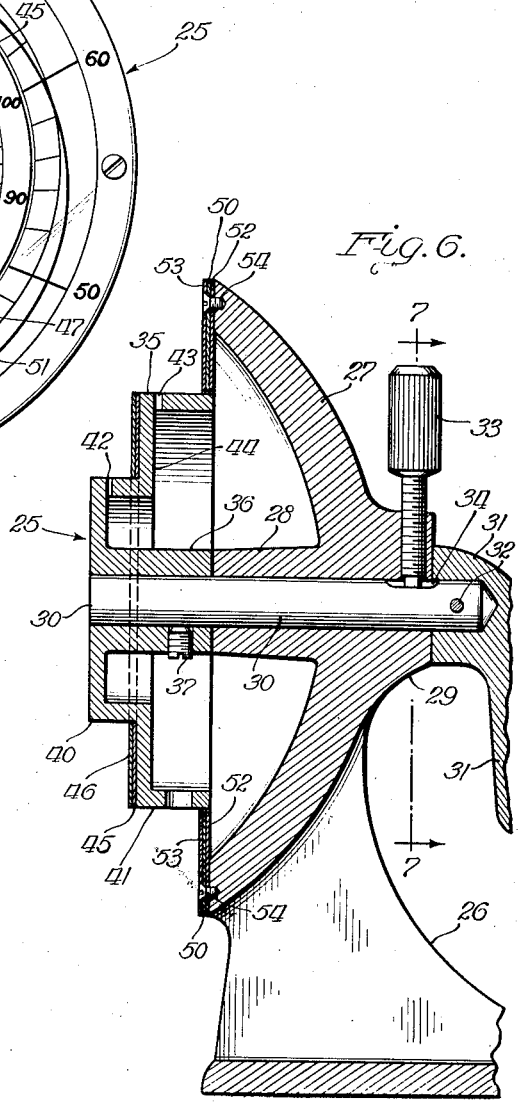
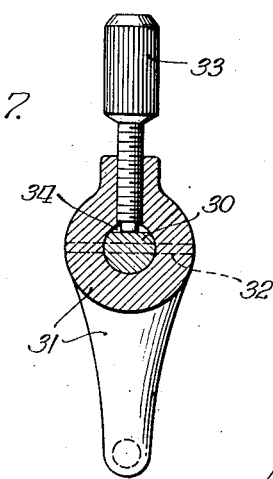

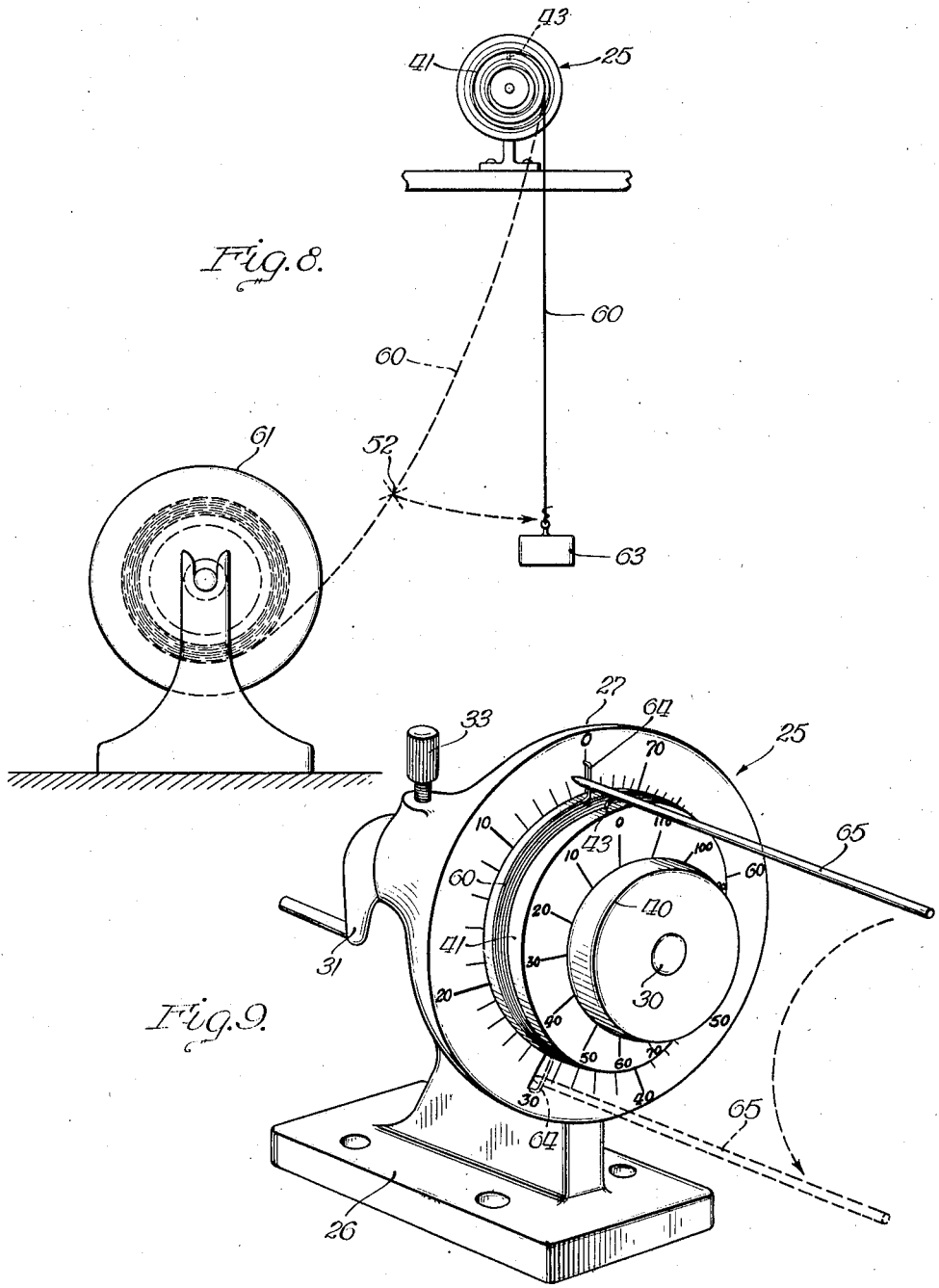

Patented Jan. 4, 1944

2,338,202

UNITED STATES PATENT OFFICE 2,338,202

WIRE TESTING APPARATUS

Raymond L. Reading, Maywood, Ill., assignor to Belden Manufacturing Company, Chicago, Ill., a corporation of Illinois Application January 6, 1941, Serial No. 373,237

4 Claims. (Cl. 73—51)

My invention relates generally to an improved method of, and device for, testing the softness of wire for winding purposes, and it has particular relation to a testing method and device which involves the measurement of the amount of unwinding or spring-back of a sample piece of wire from a mandrel, and the interpretation of such measurement to determine the windability of the wire tested.

Electrical manufacturers who purchase large quantities of wire to be used in winding electrical parts such as cores, coils, etc. are much concerned with the winding properties of wire used for these purposes. A springy wire is ordinarily hard to wind and therefore undesirable. On the other hand, the softer and less resilient a wire is, the better it is suited for making the wound parts of electrical devices.

The method now generally used to determine the softness or windability specifications of wire consists in measuring the percent elongation exhibited by sample pieces of wire. However, this test based on elongation and tensile strength determinations is only partially satisfactory, because it does not give an accurate indication of the windability of the wire as actually used. For example, a number 18 A. W. G. bare copper wire annealed at 900° F. will produce an extremely soft wire, but one which will exhibit some tendency to be springy. Now, if this same wire is annealed at 750° F., it might easily be more than 1½ times as springy as before, and yet, if the two wires were tested by the percent of elongation method for comparative softness, they would be classified alike, or at least very close together.

The principal object and purpose of my invention is to provide a device and method of testing the softness of wire for winding purposes whereby a very close and accurate indication of the windability of the wire in actual use is obtained. The improved accuracy of my softness test depends largely upon the fact that actual windings are closely simulated in making the tests. Furthermore, the invention is very practical and the testing devices embodying the invention are inexpensive, simple and rugged, and may be easily supplied in large numbers. Likewise, the technique of testing wire according to the invention is simple, rapid, and readily acquired.

When a piece of wire is wound around a mandrel with one end held at a point thereon, the other end will spring back or unwind from the mandrel when loosened or freed, to an extent depending upon the springiness or softness of the wire. The path or loci of points thus taken by the free ends of pieces of wire of different softness follows along a definite mathematical curve. Employing this phenomenon, scales or dials calibrated for different sized mandrels are made up, which may be used for testing the softness of wire of various sizes. The testing devices embodied in my invention comprise different arrangements of mandrels and associated dials or scales, as will appear hereinafter.

For a more complete understanding of the nature and scope of my invention, reference may now be had to the following detailed description taken in connection with the accompanying drawings, in which:

Figs. 1, 2, 3, 4A, and 4B are mathematical diagrams by which the principles of my invention may be explained;

Fig. 5 is a front elevational view of one form of testing device embodying the present invention;

Fig. 6 is a vertical sectional view taken on line 6—6 of Fig. 5;

Fig. 7 is a sectional view taken on line 7—7 of Fig. 6;

Fig. 8 is a diagrammatic view showing the manner in which a test sample of wire is placed on the testing device; and Fig. 9 is a perspective view showing how the softness or springiness reading for a piece of wire is obtained or determined on the wire testing device.

Figure 1:
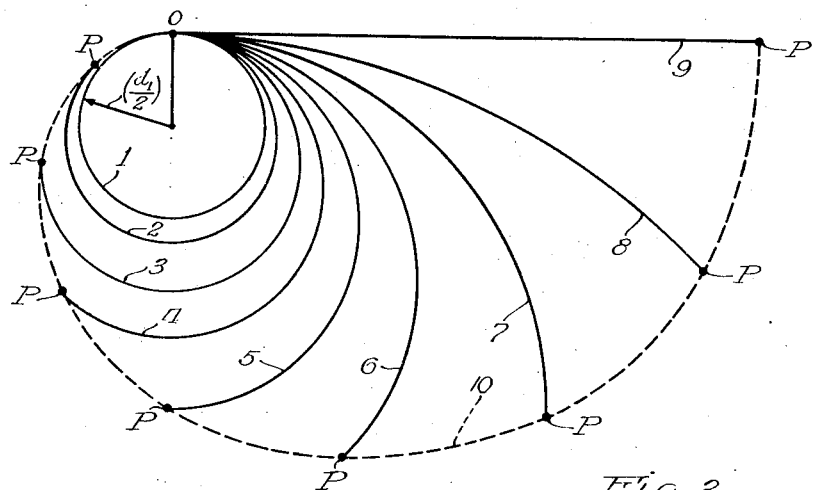

A complete understanding of my invention requires a somewhat detailed explanation of certain underlying mathematical principles that are involved. In Fig. 1, the various shapes and forms taken by different pieces of wire 1 through 9, of increasing springiness, in unwinding from a mandrel are shown. The piece of wire 1 represents a sample of wire which, hypothetically, is totally lacking in springiness. When the piece of wire 1 is wound into circular form on a mandrel and the free end is released, it will not unwind but will retain its complete contiguous circular form, as shown. The piece of wire 9 represents the other extreme. That is, the piece of wire 9 is a sample of wire which, hypothetically, is 100% springy. When such a piece of wire is wound into circular form on a mandrel, and then released, it will straighten out into a perfectly straight line, as shown. The other pieces of wire 2, 3, 4, 5, 6, 7, and 8 have various intermediate degrees of springiness or windability, in between these two extremes. That is, the piece of wire 2 has very little springiness, while the piece of wire 8 is much more springy.

All of the pieces of wire 1 through 9 have the same equal length, and one end of each piece is held fixed at the point, O, as shown. If the diameter of the circle outlined by the piece of wire 1 is $d_1$, the length of this piece, as well as the lengths of each of the other pieces, will be $\pi d_1$.

It has been found that each of the pieces of wire 2 to 8 will always take the form of an arc of a circle. As will be seen, the piece of wire 2 is in the form of a nearly closed arc, of a relatively small circle, while the piece of wire 8 is in the form of an open arc of a circle of large radius, and forms only a small portion of the entire circumference of this larger circle.

It has been found that the points P, or the free ends of the pieces of wire, fall on a definite mathematical curve 10, shown in broken line. The mathematical equation for this curve will be explained below. The curve 10 may be divided or calibrated into various degrees of springiness, softness of windability. In this way, the softness and windability properties of any sample of wire may be determined by the location taken by its free end on the curve 10 as it unwinds from a circular mandrel.

The curve 10 may be described as being the loci of points taken by the free ends of circular arcs of constant length, and increasing radii of curvature, all arcs having one end fixed at a common origin and the centers of the circles of which the arcs are a part all falling on a straight line through the common origin.

Figure 2:
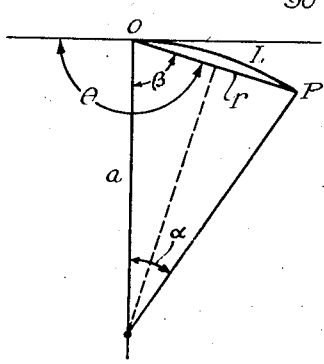

In order to derive the equation of curve 10, reference may be had to Figure 2 in which a circular arc of length L is shown with one end at an origin or pole O and the free end at P. This arc corresponds to, and is intended to represent, one of the pieces of wire, for example the piece 8, in Figure 1. (As will be noted, the diagram of Fig. 2 is drawn to a much smaller scale than the diagram of Fig. 1.) The origin O corresponds to the fixed end of the piece of wire while the point P corresponds to the free end of the piece of wire. The equation of the loci of points P, or the free ends P of different pieces of wire 1 through 9, in Figure 1, may be derived as follows, employing the diagram of Figure 2:

$$a\alpha = L$$

where $\alpha$ is expressed in radians $$r = OP = 2a \sin(\alpha/2) = 2(L/\alpha) \sin(\alpha/2)$$

$$\beta = (\pi/2) - (\alpha/2)$$

Therefore $$r = [2L/(\pi - 2\beta)] \cos \beta$$

Substituting $$\theta = \pi/2 + \beta$$

(1) $$r = \frac{L}{\pi - \theta} \sin \theta$$

However, since the length L of the arc OP is constant and equal to the circumference $\pi d_1$ of the initial circle, or the mandrel on which the wire is wound, of diameter $d_1$, another form of the equation is obtained by putting $L = \pi d_1$:

(2) $$r = \frac{\pi d_1}{\pi - \theta} \sin \theta$$

Figure 3:
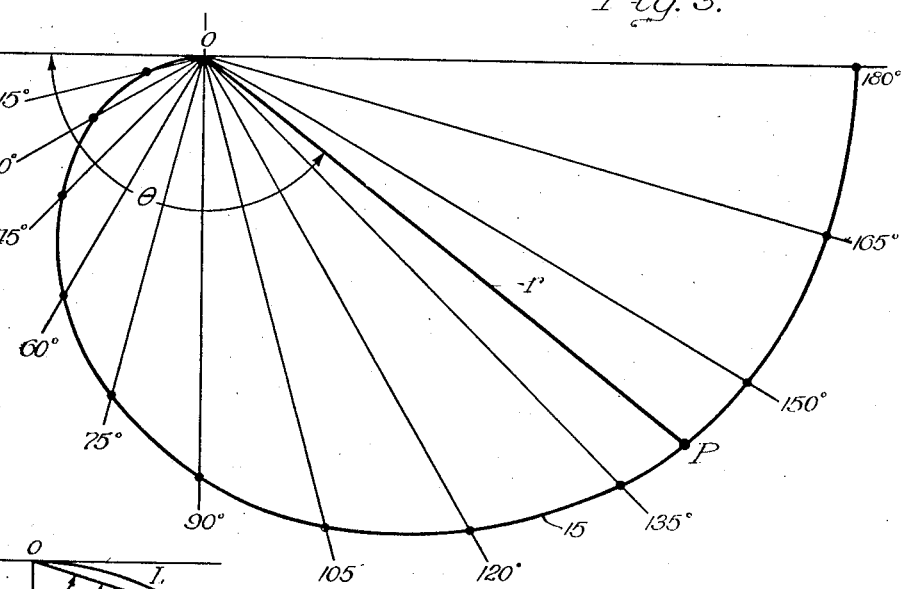

In order to check the validity of Equations 1 and 2, they may be plotted in polar coordinates, as shown in Figure 3. In Figure 3, the point O is the origin or pole of the curve 15, $r$ is the radius vector, and $\theta$ is the vectorial angle. Substituting different values of $\theta$ in the equation $$r = \frac{\pi d_1}{\pi - \theta} \sin \theta$$

where $d_1 = 3.25$), the following set of values of $r$ and $\theta$ will be obtained.

| $\theta°$ | $r$ |
|---|---|
| 0 | 0.00 |
| 15 | 0.92 |
| 30 | 1.95 |
| 45 | 3.07 |
| 60 | 4.23 |
| 75 | 5.38 |
| 90 | 6.50 |
| 105 | 7.50 |
| 120 | 8.42 |
| 135 | 9.25 |
| 150 | 9.80 |
| 165 | 10.15 |
| 180 | 10.20 |

When these values of $\theta$ and $r$ are plotted, the curve 15 will be obtained, as shown in Fig. 3. It will be seen that this curve 15 is a duplicate of the curve 10 in Figure 1.

The above basic discussion and derivations have been specifically concerned with having one full turn of wire wound on a mandrel. It has been found in practice, however, that better results are obtained, when testing wire of certain sizes, if a number of turns of wire are wound on the mandrel. The one-turn test is generally satisfactory for testing copper wire in the larger sizes, but for sizes from 14 down to 30 A. W. G., it is better to use from 3 to 5 turns on the mandrel. When wire in these small sizes is tested, there is only a small amount of spring-back or unwinding of the free end from the mandrel when one turn is used. By using a plurality of turns the amount of spring back can be increased. For example, when five turns are used, the free end will spring back substantially five times as far as when only one turn is used. Thus, a more accurate indication of the softness or windability of the wire may be obtained. Furthermore, when a number of turns are used and the pieces of wire are correspondingly longer, a more representative sample of wire is thus tested than when a shorter piece is used. In addition, when a number of turns of wire are used, actual winding conditions are more closely approximated than when only one turn is used.

The Equation 2 above is for one turn of wire only. However, it has been found that the path or curve followed by the free end of any number of turns $t_1$ of wire in unwinding from a mandrel of diameter $d_1$ may be expressed by the following general equation:

(3) $$r = \frac{\pi d_1 t_1}{\pi t_1 - \theta} \sin \theta$$

In Figure 4A of the drawings, the curve 16 described by the free end of a piece of wire of three turns as it unwinds from a mandrel of diameter $d_1$ is shown. The equation of the curve 16 is obtained by substituting 3 for the term $t_1$ of Equation 3 above. Thus the Equation 4 of the curve 16 is:

(4) $$r = \frac{3\pi d_1}{3\pi - \theta} \sin \theta$$

By substituting different values of $\theta$ in the Equation 4, and taking $d_1 = 1.875$, a corresponding set of values of the length of the radius vector $r$ may be obtained as follows:

| $\theta°$ | $r$ |
|---|---|
| 0 | 0.000 |
| 15 | 0.498 |
| 30 | 0.994 |
| 45 | 1.45 |
| 60 | 1.83 |
| 75 | 2.11 |
| 90 | 2.25 |
| 105 | 2.255 |
| 120 | 2.09 |
| 135 | 1.77 |
| 150 | 1.30 |
| 165 | 0.70 |

When this set of values of $\theta$ and $r$ are plotted, the curve 16 will be obtained, as shown in Fig. 4A.

The validity of the general Equation 3, the three-turn Equation 4, and the curve 16 of Fig. 4A may be checked as shown in the diagram in Fig. 4B. A circular mandrel 17 is shown having a diameter $d_1$ with its center at X. The vertical diameter of the mandrel 17 intersects the top thereof at a point O, as shown. Assuming one end of a piece of wire is fastened at O, and three complete turns are wound in a clockwise direction on the mandrel 17, the points P taken by the free end of the wire in unwinding from the point O will be plotted.

It will be seen that when the wire has not unwound at all from the mandrel 17, the free end will be at the point O where the fixed end is held. Now, if the wire unwinds to any extent, the free end will not be at O, but at some point P counterclockwise removed therefrom. However, although after unwinding there will not then be three complete turns of wire, all of the turns of wire will lie in a circle of a larger diameter than the diameter $d_1$ of the mandrel 17. The radius of any of these larger or expanding circles formed by the wire in unwinding may be designated as $m$. It will also be seen that since one end of the wire is fixed at point O, the centers of these expanding circles will lie at some point Y on the vertical diameter of the mandrel and some distance below the center X thereof. The point O will be the end of the vertical diameters of all of these expanding circles.

The length of the piece of wire forming these expanding circles is constant and equal to three times the circumference $\pi d_1$ of the mandrel 17. Letting $\gamma$ equal the angle between the vertical and the radius $m$ drawn between any free-end P of the wire and the center Y of its corresponding expanding circle, it has been found that the length of the radius $m$ may be expressed as follows:

$$(5) \qquad m = \frac{360}{360 - \frac{\gamma}{3}} \left(\frac{d_1}{2}\right)$$

By substituting various values of $\gamma$ in Equation 5, the corresponding values of $m$ may be obtained. For example, the length of a radius 18, Fig. 4B, where $\gamma$ has a value of 60° and $d_1$ has a value of 1.875, may be obtained as follows:

$$(6) \qquad m_{18} = \frac{360}{360 - \frac{60}{3}} \times \frac{1.875}{2} = 0.993$$

The complete set of values of radii between values of $\gamma$ from 0° to 330° where the mandrel 17 has a diameter of 1.875 may be similarly calculated and the following set of values obtained:

| $\gamma°$ | $m$ |
|---|---|
| 0 | 0.938 |
| 30 | 0.965 |
| 60 | 0.993 |
| 90 | 1.022 |
| 120 | 1.055 |
| 150 | 1.090 |
| 180 | 1.125 |
| 210 | 1.165 |
| 240 | 1.205 |
| 270 | 1.250 |
| 300 | 1.298 |
| 330 | 1.350 |

Each of the points P for each set of values is determined or located by laying off a value of OY equal to the particular value of $m$. For instance, in the case of point $P_1$, Fig. 4B, $OY_1$ is laid off as 0.993. Then the radius $m_{18}$ is drawn out from $Y_1$ at an angle of 60° from the vertical diameter, as shown in Fig. 4B. The point $P_1$ is located by laying off $Y_1P_1$ equal to $OY_1$.

By repeating these steps, the other points P may be determined and the resulting curve 20 drawn therethrough. It will be seen that the curves 16 of Fig. 4A and curve 20 of Fig. 4B are identical.

In the diagram of Fig. 4B, each of the expanding radii at the different angles have been extended outside or beyond the curve 20, as shown. Since each of these extensions is an extension of a radius, each is thereby normal to the curve 20 at the intersections therewith.

These extensions or normals, $e$, form a scale by which the amount of spring-back or unwinding of the free end P from the point O may be measured. Preferably, this scale is graduated in degrees of spring-back or unwinding per turn of wire. Thus, each of the values of $\gamma$ will be divided by a factor of 3. For example, the extension $e_1$ of the radius $m_{18}$ having a value of $\gamma$ of 60° is marked as 20°. The other extensions are similarly marked as 0°, 10°, 30°, 40°, 50°, 60°, 70°, 80°, 90°, 100°, and 110°, as shown. It will be understood that intermediate graduations or divisions may be readily marked off.

The discussion, procedure, and equations given above in connection with Figures 4A and 4B for three turns of wire in unwinding from a mandrel, are of general application. Diagrams and scales, similar to those shown in Fig. 4B, may be developed for any number of turns of wire. The Equation 5 may be generally expressed for any number of turns $t_1$ as:

$$(5) \qquad m = \frac{360}{360 - \frac{\gamma}{t_1}} \left(\frac{d_1}{2}\right)$$

A curve for any number of turns of wire corresponding to curve 20 of Fig. 4B, may be drawn, and a scale therefor may be graduated in terms of degrees of spring or unwinding of the free end per turn of wire on the mandrel.

Although, normally scales and curves will be based on complete turns of wire, it is obvious that they may be based on fractional turns such as 2½, 3¼, etc.

Referring to Figs. 5, 6, and 7 of the drawings, a working embodiment of my invention in the form of a wire testing device is shown generally at 25. The main body of the wire tester 25 consists of a casting which comprises a base 26 and an upright dish-shaped dial support 27, formed integrally therewith. A central hub 28 projects from the inside of the support 27. The front edge of the hub 28 is plain and even with the rim or edge of the dial support 27. The rear of the dial support 27 is formed into a thickened portion or bearing 29. A hole of uniform diameter extends through the hub 28 and bearing 29, as shown. The body of the testing device 25 including the base support 26, dial support 27, hub 28, and the rear bearing 29, may be made of cast aluminum, or any other satisfactory material. It will be understood that the body of the testing device 25 may be formed or built in other forms or constructions.

A shaft 30 is journalled in the hub 28 and bearing 29, and projects at both ends beyond these parts, as shown. In order to turn or rotate the shaft 30, a crank 31 is provided which fits over the right hand projecting end of the shaft and is keyed thereto by a pin 32. A small threaded hole is tapped through the top of the bearing portion 29, into which a thumb screw 33 is screwed. A shallow, flat recess 34 is cut in the side of the shaft 30 into which the flat end of the thumb screw 33 fits, as shown. By tightening the thumb screw 33 into the recess 34, the shaft 30 may be locked or fixed in a predetermined position. When the thumb screw 33 is turned out or loosened, the lower end thereof will be withdrawn from locking engagement with the recess 34 and the shaft 30 may be rotated by turning the crank 31.

A two-diameter mandrel member 35 with a central hub 36 fits over the left hand projecting end of the shaft 30. The mandrel member 35 may be fastened in any desired position on the shaft 30 by a set screw 37. The mandrel member 35 includes a small diameter mandrel 40, and a larger diameter mandrel 41. Angularly aligned holes 42 and 43 are formed or drilled through the mandrel surfaces, as shown. The holes 42 and 43 are provided so that the ends of pieces of wire being tested may be inserted therein and thus retained on the mandrel, as will appear hereinafter. The rear or back edge of the small mandrel 40 and the front edge of the larger mandrel 41 are connected by an integral, annular wall 44 having a plane annular outer or front surface.

In the particular embodiment of my invention shown, the mandrel 40 is intended to be used in testing three turns of wire. Accordingly, an annular dial 45 and Celluloid protecting member 46 are slipped over the small mandrel 40 and fastened to the annular mandrel connecting wall 44 by four screws 47 (Fig. 5). Referring particularly to Fig. 5 of the drawings, it will be seen that scale 45 of the dial comprises a curve 20' which corresponds to the curve 16 in Fig. 4A, and the curve 20 in Fig. 4B. The scale of the dial 45 is graduated in degrees of spring-back or unwinding per turn, and the zero mark of the scale is angularly aligned with the small hole 42 in the mandrel 40, as shown. It will be seen that the small mandrel 40, the large mandrel 41, and the scale 45 rotate as a unit when the shaft 30 is turned.

The larger diameter mandrel 41 is adapted to be used for testing sample pieces of wire in five turns thereon. Accordingly, a dial 50 is made, which is calibrated in degrees of spring-back or unwinding per turn on the mandrel 41. The dial 50 (Fig. 5) has a curve 51 drawn thereon which corresponds to the curve 20' on the dial 45. However, it will be noted that the curve 51 is not the same shape as the curve 20', since it is developed for five turns instead of for three. The graduations for the dial 50 comprise normals to the curve 51 as shown. The dial 50 is placed between an annular metal plate 52 and an annular Celluloid cover 53, and this assembly is held or fastened to the front edge of the dial support 27 by screws 54, as shown in Fig. 6. The zero mark of the dial 50 is angularly aligned with the vertical diameter of the dial support 27. It will be seen that the mandrel 41 is rotated inside of the annular scale 50. The mandrel member 35 is so set on the shaft 30 that when the shaft is locked in position by the thumb screw 33, the zero marks of the scales 45 and 50 will be angularly aligned, as well as the small holes 42 and 43 in the surfaces of the large and small mandrels 40 and 41.

Although it will be understood that wire testing devices embodying my invention may be made in different dimensions and sizes, I have found that for most testing purposes satisfactory results are obtained when the small mandrel 40 has a diameter of 1⅞ inches, and the large mandrel 41 has a diameter of 3¼ inches.

Wire in sizes of 30 down to 21 A. W. G. is satisfactorily tested on the small mandrel 40, while larger wire in sizes of 20 to 14 A. W. G. may be satisfactorily tested on the larger mandrel 41.

The technique of testing samples of wire on the wire tester 25, and the operation thereof, will be described in connection with Figs. 8 and 9 of the drawings. For purposes of explanation, the technique will be described in connection with testing a sample piece of wire of five turns on the larger mandrel 41. Referring to Fig. 8, a piece of wire 60, shown in broken lines, is unwound from a reel of wire 61 in the manner shown. The end of the wire 60 is brought around the right side of the large mandrel 41 and inserted in the hole 43 in the top thereof. The piece of wire 60 is now cut at the point indicated by the cross 62 and a one-pound weight 63 fastened thereto, as shown. The thumb screw 33 is now unturned so that the shaft 30 and mandrel member 35 may be turned by the crank 31. After five complete turns of wire have been wound in a clockwise direction on the mandrel 41, the testing device 25 is locked by turning down the thumb screw 33. The piece of wire 60 is now cut so that a free end 64 may be turned up at the zero graduation as shown in Fig. 9.

Now in order to test the softness or windability of the piece of wire 60, a pencil or stylus 65 is used to hold the free end 64 in place as shown in Fig. 9. The stylus 65 is slowly moved counter-clockwise around the scale of the dial 50, as indicated, with the free wire end 64 following it until the free end 64 will spring back or unwind no further. By way of illustration, the free end is shown in Fig. 9 in broken line as having sprung back to the 30 mark or graduation of the scale 50. Hence, the piece of wire 60 may be said to have a windability or softness of 30° per turn.

Different sized weights, corresponding to the weight 63, are used in testing wire of different sizes on different sized mandrels. The following table to be used in connection with testing sample pieces of wires on the wire testing device 25, having the particular dimensions as specified above, has been found to be satisfactory.

| A. W. G. | Mandrel | Weights | Turns |
|---|---|---|---|
| | Inches | | |
| 14 to 20 | 3¼ | 1 lb | 5 |
| 21 to 24 | 1⅞ | 4 oz | 3 |
| 25 to 30 | 1⅞ | 2 oz | 3 |

The method of testing wire described, and the wire testing device 25 are suitable for both laboratory and production tests. Very uniform and accurate results may be obtained by an operator after relatively little experience and instruction.

An actual illustration may be used to show the important advantages of my invention. A #18 A. W. G. bare copper wire annealed at 900° F. will produce an extremely soft wire. It will, however, exhibit some tendency to spring. When a sample of such a wire was tested according to the method, and on the testing device of my invention, using a 3¼" mandrel with a one pound tensioning weight and five turns, this wire showed a spring-back at 24° per turn.

When this same wire was annealed at 750° and similarly tested, according to my invention, it showed a spring-back of 33° per turn. This was an increase in springiness of 9° per turn. However, when these two wires were tested by the percent of elongation method normally used for determining comparative softness, they were classified as being alike, or at least very close together.

The application of insulation to a bare wire imparts an additional hardness or springiness to the wire, due partly to the stiffening effect of the insulation and partly to the work hardening of the wire due to bending during processing. The sample of #18 A. W. G. wire, annealed at 750° F., previously referred to as having a spring-back of 33° per turn, had a percent elongation of 40% when bare. When this piece of wire was insulated with an enamel coating, it exhibited a loss of from 1 to 2% of the elongation. However, the windability or springiness increased to 51° per turn as tested according to my invention. Thus where the percent elongation test showed only a slight change, my test indicated an increase in springiness of 18° per turn.

From this discussion of actual comparative tests, it is obvious that more accurate indications of the actual softness of wire for winding purposes may be obtained according to the method and apparatus of my invention.

From a large number of tests, it has been established that my foregoing method and apparatus of testing the softness of wire for windability has the following advantages:

1. It is an accurate check on the actual windability of wire.
2. The results can be duplicated readily and by different operators.
3. The testing device is suitable for laboratory, as well as shop and inspection department requirements.
4. Test samples are sufficiently large to give averaging results, and are less affected by the initialed curvature of the wire imparted by the reel or coil.
5. The time required to make the tests is not greater (is equal or less) than that required for practicing existing methods.
6. The testing device or apparatus is rugged, simple, and of inexpensive construction.

It will be seen that certain changes and modifications may be made in the technique of using, and the construction of wire testing apparatus of, my invention. However, the broad underlying principles and features will remain the same. Accordingly, it is intended that all matter shown in the accompanying drawings or described hereinbefore shall be interpreted as illustrative only and not in a limiting sense.

I claim:

1. A device for testing the softness or windability of wire comprising, in combination, a cylindrical mandrel, a shaft supporting said mandrel, journal support means for said shaft providing rotatable movement of said mandrel, means for retaining one end of a piece of wire being tested at a point on said mandrel, a dial, means supporting said dial, adjacent said mandrel in cooperative relationship therewith, the graduations of said dial comprising normals to a curve the equation of which in polar coordinates is $$r = \frac{\pi d_1 t_1}{\pi t_1 - \theta} \sin \theta$$

where $r$ is the radius vector, $\theta$ is the vectorial angle in radians, $t_1$ is the number of turns of wire wound on said mandrel, and $d_1$ is the diameter of the mandrel, said mandrel and said dial being so disposed relative to each other that said point on said mandrel where one end of the wire being tested is retained is rotatable into angular coincidence with the origin of said curve, said dial being calibrated in degrees of spring-back or unwinding per turn of wire on the mandrel, and stop means for locking said mandrel against movement relative to said dial when the point at which said wire is held on said mandrel is in angular coincidence with the origin of said curve.

2. A device for measuring the windability or softness of wire comprising, in combination, a support body; a hub projecting from said support body; a shaft journaled in said hub and projecting therefrom; a small and narrow mandrel mounted on said shaft and adapted to have a number of turns of small size wire wound thereon, a small hole being provided in the surface of the small mandrel in which one end of a piece of wire wound thereon may be held; a dial movably mounted with said mandrel and fitting therearound; the graduations of said dial comprising normals to a curve the equation of which expressed in polar coordinates is $$r = \frac{\pi d_1 t_1}{\pi t_1 - \theta} \sin \theta$$

where $r$ is the radius vector, $\theta$ is the vectorial angle expressed in radians, $t_1$ is the number of turns of wire wound on said small mandrel, and $d_1$ is the diameter of said small mandrel, the origin of said curve coinciding in angular alignment with said small hole in the mandrel surface, and said dial being calibrated in degrees of spring-back or unwinding per turn of wire on the small mandrel; a larger mandrel mounted on said shaft and adapted to have a number of turns of larger size wire wound thereon, a small hole being provided in the surface of the larger mandrel in which one end of a piece of wire wound thereon may be held; and a fixed dial fitting around said larger mandrel and supported on said support body; the graduations of said fixed dial comprising normals to a curve the equation of which expressed in polar coordinates is $$r = \frac{\pi d_2 t_2}{\pi t_2 - \theta} \sin \theta$$

where $r$ is the radius vector, $\theta$ is the vectorial angle in radians, $t_2$ is the number of turns of wire wound on said larger mandrel, and $d_2$ is the diameter of said larger mandrel, said larger mandrel being rotatable so that said small hole in the surface thereof may be angularly aligned with the origin of the graduation curve of said fixed dial, and said fixed dial being calibrated in degrees of spring-back or unwinding per turn of wire wound on said larger mandrel.

3. A device for measuring the windability or softness of wire comprising, in combination; a support base; a dish-shaped support member carried on said support base; a central hub projecting from the center of said dish-shaped support member with the opening in the hub passing through the rear of the dish member; a shaft journaled in said hub and projecting beyond the rim of said dish-shaped support member; a crank connected to the rear end of said shaft for turning the same; a multi-diameter mandrel member centrally mounted on the projecting end of said shaft having a small diameter mandrel and a larger diameter mandrel with a plane annular wall between the outer edge of the larger mandrel and the inner edge of the smaller mandrel, and small angularly aligned holes provided in the surfaces of the small and larger mandrels whereby the ends of pieces of wire may be inserted and held; a dial for said small mandrel mounted on said plane annular wall and rotatable with said multi-diameter mandrel member, the graduations of said dial comprising normals to a curve the equation of which expressed in polar coordinates is $$r = \frac{\pi d_1 t_1}{\pi t_1 - \theta} \sin \theta$$

where $r$ is the radius vector, $\theta$ is the vectorial angle in radians, $t_1$ is the number of turns of wire wound on said small mandrel in testing thereon, and $d_1$ is the diameter of said small mandrel, the origin or pole of said dial graduation curve coinciding in angular alignment with the small wire hole in the small mandrel, and said dial being calibrated in degrees of spring-back or unwinding per turn of wire wound on the small mandrel; a stationary dial for said larger mandrel fitting around the back thereof and fastened to the rim of said dish-shaped support member, the graduations of said stationary dial comprising normals to a curve the equation of which expressed in polar coordinates is $$r = \frac{\pi d_2 t_2}{\pi t_2 - \theta} \sin \theta$$

where $r$ is the radius vector, $\theta$ is the vectorial angle in radians, $t_2$ is the number of turns of wire wound on the larger mandrel in testing thereon, and $d_2$ is the diameter of the larger mandrel, said larger mandrel being rotatable so that the wire hole in the surface thereof may be angularly aligned with the origin or pole of the graduation curve of said stationary dial for the larger mandrel, and said stationary dial being calibrated in degrees of spring-back or unwinding per turn of wire wound on said larger mandrel; and stop means for locking said multi-diameter mandrel member in angular relationship with the stationary dial for the larger mandrel.

4. In combination in a device for measuring the windability or softness of wire, a mandrel which comprises two concentric cylindrical sections of differing diameters disposed longitudinally adjacent each other, means supporting said mandrel for rotative movement including a supporting shaft, a stationary support member in which said shaft is journaled, and a crank for rotating said shaft and mandrel, angularly aligned holes being provided in the surface of each section of said mandrel, each of said holes being adapted to receive and hold one end of a piece of wire to be tested, a scale for said smaller mandrel section supported on and rotatable with said larger mandrel section, and a scale for said larger mandrel section fixedly mounted on said stationary mandrel support means, the graduations on each of said scales comprising normals to a curve the equation of which expressed in polar coordinates is $$r = \frac{\pi d t}{\pi t - \theta} \sin \theta$$

where $r$ is the radius vector, $\theta$ is the vectorial angle in radians, $t$ is the number of turns of wire wound on said mandrel section, and $d$ is the diameter of said mandrel section, said scales being calibrated in degrees of spring back or unwinding per turn of wire on the associated mandrel section, the origin of the curve on the scale for the smaller mandrel section coinciding in angular alignment with the said hole in said smaller mandrel section, the said hole in the larger mandrel section being in angular alignment with the origin of the curve on the scale for the larger mandrel section when said mandrel is rotated into a predetermined position, and stop means for locking said mandrel in said predetermined position during the use of said larger mandrel.

RAYMOND L. READING.

CERTIFICATE OF CORRECTION.

Patent No. 2,338,202. January 4, 1944.

RAYMOND L. READING.

It is hereby certified that error appears in the printed specification of the above numbered patent requiring correction as follows: Page 2, first column, line 21, for "of" read --or--; and second column, line 6, before "where" insert an opening parenthesis; line 37, strike out the syllable and words "ing of the free end from the mandrel when one"; page 6, second column, line 50, claim 4, after "mandrel" insert --section--; and that the said Letters Patent should be read with this correction therein that the same may conform to the record of the case in the Patent Office.

Signed and sealed this 18th day of April, A. D. 1944.

(Seal)

Leslie Frazer
Acting Commissioner of Patents.